(12) United States Patent
Iwaya et al.

(10) Patent No.: US 11,256,037 B2
(45) Date of Patent: Feb. 22, 2022

(54) OPTICAL-PATH-BENDING CONNECTOR AND OPTICAL-PATH-BENDING CONNECTOR ASSEMBLY

(71) Applicant: FURUKAWA ELECTRIC CO., LTD., Tokyo (JP)

(72) Inventors: Mitsuhiro Iwaya, Tokyo (JP); Katsuki Suematsu, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/136,731

(22) Filed: Dec. 29, 2020

(65) Prior Publication Data

US 2021/0116650 A1  Apr. 22, 2021

Related U.S. Application Data

(63) Continuation of application No. PCT/JP2019/010792, filed on Mar. 15, 2019.

(30) Foreign Application Priority Data

Jul. 4, 2018  (JP) ............................. JP2018-127325

(51) Int. Cl.
*G02B 6/38* (2006.01)
*G02B 6/42* (2006.01)

(52) U.S. Cl.
CPC ......... *G02B 6/3829* (2013.01); *G02B 6/4202* (2013.01)

(58) Field of Classification Search
None
See application file for complete search history.

(56) References Cited

U.S. PATENT DOCUMENTS 6,402,389 B1   6/2002  Steijer et al.
2012/0027357 A1*  2/2012  Rosenberg ........... G02B 6/3885
                                                  385/76

(Continued)

FOREIGN PATENT DOCUMENTS

CN   1217070 A   5/1999
CN   1452724 A   10/2003

(Continued)

OTHER PUBLICATIONS

International Search Report issued in PCT Patent Application No. PCT/JP2019/010792 dated Jun. 4, 2019.

(Continued)

*Primary Examiner* — Michael Stahl
(74) *Attorney, Agent, or Firm* — Marshall, Gerstein & Borun LLP

(57) ABSTRACT

An optical fiber is contacted by a first guide part on the inside of a bend. The first guide part is disposed apart from a region of a fixing member from which the optical fiber is drawn out. Specifically, a first non-contact part in which the optical fiber does not contact a guide member is provided between the first guide part and the drawn out part of the optical fiber from the fixing member. The optical fiber also contacts a second guide part on the outside of the bend. The second guide part is disposed apart from the first guide part, and a second non-contact part in which the optical fiber does not contact the guide member is also provided between the first guide part and the second guide part.

8 Claims, 4 Drawing Sheets

(56) References Cited

U.S. PATENT DOCUMENTS

| | | | |
|---|---|---|---|
| 2013/0223795 A1 | 8/2013 | Sasaoka et al. | |
| 2016/0231521 A1 | 8/2016 | Smith et al. | |
| 2016/0274314 A1 | 9/2016 | Sasaki et al. | |
| 2016/0291261 A1* | 10/2016 | Izumi | G02B 6/421 |
| 2017/0123164 A1* | 5/2017 | Suematsu | G02B 6/3829 |
| 2017/0343743 A1* | 11/2017 | Kuang | G02B 6/3829 |

FOREIGN PATENT DOCUMENTS

| | | |
|---|---|---|
| CN | 101852898 A | 10/2010 |
| CN | 206470440 U | 9/2017 |
| JP | 2000-509839 A | 8/2000 |
| JP | 2002-122910 A | 4/2002 |
| JP | 2010-128112 A * | 6/2010 |
| JP | 2015-31801 A | 2/2015 |
| JP | 3205876 U | 8/2016 |
| JP | 2016-534412 A | 11/2016 |
| JP | 2018-151571 A | 9/2018 |
| WO | WO-2015/093520 A1 | 6/2015 |
| WO | WO-2017022026 A1 | 2/2017 |

OTHER PUBLICATIONS

Office Action issued in Chinese Patent Application No. 201980042400 dated Dec. 1, 2021.

* cited by examiner

OPTICAL-PATH-BENDING CONNECTOR AND OPTICAL-PATH-BENDING CONNECTOR ASSEMBLY

TECHNICAL FIELD

The present invention relates to an optical-path-bending connector and the like for bending an optical path in optical communication and the like.

BACKGROUND

There are cases in which an optical component such as a surface-emitting laser is mounted on a substrate and this optical component optically communicates with an external device. The optical component, in general, emits light in a direction that is substantially perpendicular to a surface of the substrate (or sometimes slightly slanted). Thus, to install optical wiring on the surface of the substrate, it is necessary to bend its optical path.

On the other hand, components installed in a data center transceiver, for example, include many components that are stacked in layers and disposed, and thus reducing height of the individual components is desired for downsizing. For this reason, optical paths must be bent within a minimum space. For example, an optical path of a component installed in a common data center transceiver must be bent in a space having a height of 5 mm or less.

As a means of bending such an optical path, there is a method using lenses or mirrors. However, the method using lenses or mirrors have accuracy problems and it is difficult to apply such the method to single-mode light. For example, thermal expansion or the like of the lenses or mirrors makes it difficult to bend optical paths of single-mode light with accuracy.

Meanwhile, a method for bending an optical path by using an optical fiber has been proposed (Japanese Utility Model Registration No. 3205876 (JP-UM-R-3205876) and Japanese Unexamined Patent Application Publication No. 2013-122522 (JP-A-2013-122522), for example).

To bend an optical path by using an optical fiber, the optical fiber needs to be bent with a intended curvature. However, an optical fiber is weak against bending, and the optical fiber breaks if its radius of curvature becomes too small. For this reason, in Japanese Utility Model Registration No. 3205876 (JP-UM-R-3205876) and Japanese Unexamined Patent Application Publication No. 2013-122522 (JP-A-2013-122522), a guide having a curved surface is formed and an optical fiber is bent along this curved surface so that the optical fiber does not bend beyond a predetermined radius of curvature. Furthermore, a part or an entire part of the optical fiber is pressed from an outer surface side so that the optical fiber is interposed and held being pressed against the curved surface.

However, to make sure that the optical fiber is kept and held at the predetermined radius of curvature, it is necessary to insert and press the optical fiber with some tension applied to the optical fiber so as to keep a predetermined length of the optical fiber being pressed against the curved surface. However, if the optical fiber is pressed against the curved surface in this way, lateral pressure may cause transmission loss. In particular, since the optical fiber is fixed from inner and outer sides being applied with tension to be fixed, the optical fiber receives lateral pressure from both inner and outer sides, which causes transmission loss. Also, such effects become noticeable when a length of the optical fiber that is in contact with the curved surface becomes longer.

Also, if a fixing member that fixes an end portion of the optical fiber facing the optical component is separately formed from a member that has the curved surface guide, there may be a level difference or the like generated between the two when assembled. In such a case, when the optical fiber is pressed against the curved surface, the optical fiber may be bent sharply at the level difference part, which causes transmission loss and, moreover, a breakage of the optical fiber. On the other hand, if the two are formed as one body, its shape becomes complicated, which makes manufacturing as well as a fixing operation of the optical fiber difficult.

SUMMARY OF THE DISCLOSURE

The present invention was made in view of such problems. Its object is to provide an optical-path-bending connector and the like that can prevent breakage of an optical fiber while reducing transmission loss.

To achieve the above object, a first invention is an optical-path-bending connector for bending an optical path, the optical-path-bending connector including one or more optical fibers, a fixing member for fixing the optical fibers, and a guide member to which the fixing member is fitted. One end of the optical fiber is exposed at a first side of the fixing member, and the optical fiber is lead out from a second side of the fixing member to be bent inside the guide member. The guide member includes a first guide part, which is disposed apart from the second side of the fixing member, and a second guide part, which is disposed apart from the first guide part. An inner side of a bend of the optical fiber is in contact with the first guide part. An outer side of the bend of the optical fiber is in contact with the second guide part. The optical fiber is lead out from a rear of the second guide part. The optical fiber includes a first non-contact part and a second non-contact part. The first non-contact part in which the optical fiber does not contact a guide member is provided between the second side of the fixing member and the first guide part. The second non-contact part in which the optical fiber does not contact the guide member is provided between the first guide part and the second guide part.

A part of the first guide part facing the optical fiber may have a curved surface shape, and a radius of curvature of the bend of the optical fiber may be different from a radius of curvature of a curved surface of the first guide part so that the optical fiber contacts a part of the curved surface shape and there may be a gap created partly between the optical fiber and the curved surface shape.

It is preferable that the outer side of the bend of the optical fiber at a contacting part between the optical fiber and the first guide part does not contact the guide member, and that the inner side of the bend of the optical fiber at a contacting part between the optical fiber and the second guide part does not contact the guide member.

It is preferable that a polymer coating at one end side of the optical fiber is stripped off over a predetermined length, and that the fixing member holds and fixes together both a part where the polymer coating is stripped and a part of a tip end portion of the polymer coating.

The optical fiber may be lead out from the guide member downwardly, slanting against the plane parallel to a lower surface of the fixing member where the one end of the optical fiber is exposed.

The first guide part and the optical fiber may be in point contact.

The guide member may include an accommodating part that accommodates the fixing member, and the accommodating part and the fixing member may be in surface contact and are fixed to each other at least on a substantially opposite side of a bending direction of the optical fiber.

According to the first invention, the fixing member for fixing the optical fiber and the guide member to which the fixing member is attached are formed separately. Thus, an operation of fixing the optical fiber to the fixing member is easy, and the optical fiber that is set to the fixing member can be disposed easily onto the guide member. Also, the first guide part that contacts the inner surface of the bend of the optical fiber is disposed apart from the fixing member, and this prevents the optical fiber from receiving a sharp bend even if there is a slight position shifting between the fixing member and the guide member.

Furthermore, the first guide part that contacts the inner face of the bend of the optical fiber is disposed apart from the second guide part that contacts the outer face of the bend of the optical fiber, and this prevents the optical fiber from being held from both inner and outer sides at the same time, which can prevent the optical fiber from receiving excess stress.

Such an effect can be obtained with certainty when the outer side of the bend of the optical fiber does not contact the guide member at the first guide part and the inner side of the bend of the optical fiber does not contact the guide member at the second guide part.

Also, if the first guide part has the curved surface shape, it is possible to prevent the optical fiber from bending beyond the radius of curvature of the curved surface shape even in a case where some tension is applied to the optical fiber. Also, in a normal state, by making the radius of curvature of the bend of the optical fiber different from that of the curved surface of the first guide part, it is possible to create a gap partly between the optical fiber and the curved surface. This can decrease a contacting length between the optical fiber and the guide member, which means that a length of the optical fiber that receives stress from the guide member can be shortened. In such a case, it is preferable to make the radius of curvature of the curved surface of the first guide part smaller than the radius of curvature of the bend of the optical fiber.

Such an effect can be obtained with certainty if the first guide part and the optical fiber are in point contact.

Also, the polymer coating at one end side of the optical fiber is stripped off over a predetermined length, and the fixing member holds and fixes both a part where the resin coating is stripped and a part of a tip end part of the polymer coating together. In this way, the polymer coating can protect a lead-out portion of the optical fiber from the fixing member where bending stress is likely to be the strongest.

Also, if the optical fiber is lead out from the guide member downwardly, it is possible to prevent the optical fiber from contacting a ceiling of a case or a cover, for example.

Also, if the accommodating part accommodating the fixing member and the guide member are in surface contact and are fixed to each other on the side that is substantially opposite to the bending direction of the optical fiber, a position shifting or falling of the fixing member and the guide member due to repulsion force of the optical fiber can be prevented.

A second invention is an optical-path-bending connector assembly including: an optical-path-bending connector and an MT connector provided on an end portion of an optical fiber lead out from the optical-path-bending connector. The optical-path-bending connector includes a fixing member for fixing the optical fiber and a guide member to which the fixing member is attached. The fixing member and the guide member are formed separately. One end of the optical fiber is exposed at a first side of the fixing member, and the optical fiber is lead out from a second side of the fixing member to be bent inside the guide member. An inner side of a bend of the optical fiber is in contact with a first guide part. An outer side of the bend of the optical fiber is in contact with a second guide part, and the optical fiber is lead out from a rear of the second guide part to an outside of the guide member to be equipped with the MT connector. The first guide part is disposed apart from the second side of the fixing member where the optical fiber is drawn out, and a first non-contact part, in which the optical fiber does not contact the guide member, is provided between the second side of the fixing member and the first guide part. The second guide part is disposed apart from the first guide part, and a second non-contact part, in which the optical fiber does not contact the guide member, is provided between the first guide part and the second guide part.

The second invention can provide a small-sized optical-path-bending connector assembly that can reduce transmission loss.

The present invention can provide an optical-path-bending connector and the like that can prevent breakage of an optical fiber, while reducing transmission loss.

DETAILED DESCRIPTION

Figure 1:
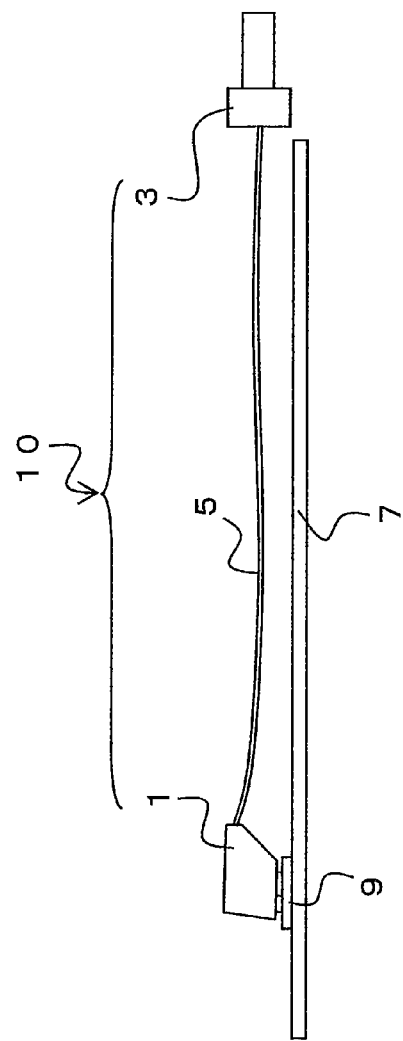
FIG. 1 is a view showing an optical-path-bending connector assembly 10.

Hereinafter, an embodiment of the present invention will be described with reference to the accompanying drawings. FIG. 1 is a view showing an optical-path-bending connector assembly 10. The optical-path-bending connector assembly 10 includes an optical-path-bending connector 1, an MT connector 3, and so on. The optical-path-bending connector 1 is connected with an optical component 9 that is mounted on a substrate 7.

The optical component 9 is a semiconductor laser, for example, that emits light in a direction substantially perpendicular, or slightly slanting, to a surface of the substrate 7. The optical component 9 may also be a light receiving part into which light enters, or may be a waveguide to which a light emitting element or a light receiving element are coupled. The optical-path-bending connector 1 includes an optical fiber 5, one end face of which is connected and fixed with the optical component 9. The optical fiber 5 is an optical fiber having a clad diameter of 125 µm or a thin optical fiber having a diameter of 80 µm, for example. The optical fiber 5 lead out from the optical-path-bending connector 1 is drawn out in a direction that is substantially parallel to the surface of the substrate 7, and the other end portion of the optical fiber 5 is connected with the MT connector 3.

The optical-path-bending connector assembly 10 is accommodated in a case or the like, for example. Thus, the size of the case limits an overall height of the optical-path-bending connector 1 including the optical fiber 5. For example, a more compact component can be obtained if the overall height of the optical-path-bending connector 1 (a vertical height from an end surface thereof that is joined with the optical component 9) is 5 mm or less, more preferably 4 mm or less, or furthermore preferably 3.5 mm or less.

Figure 2:
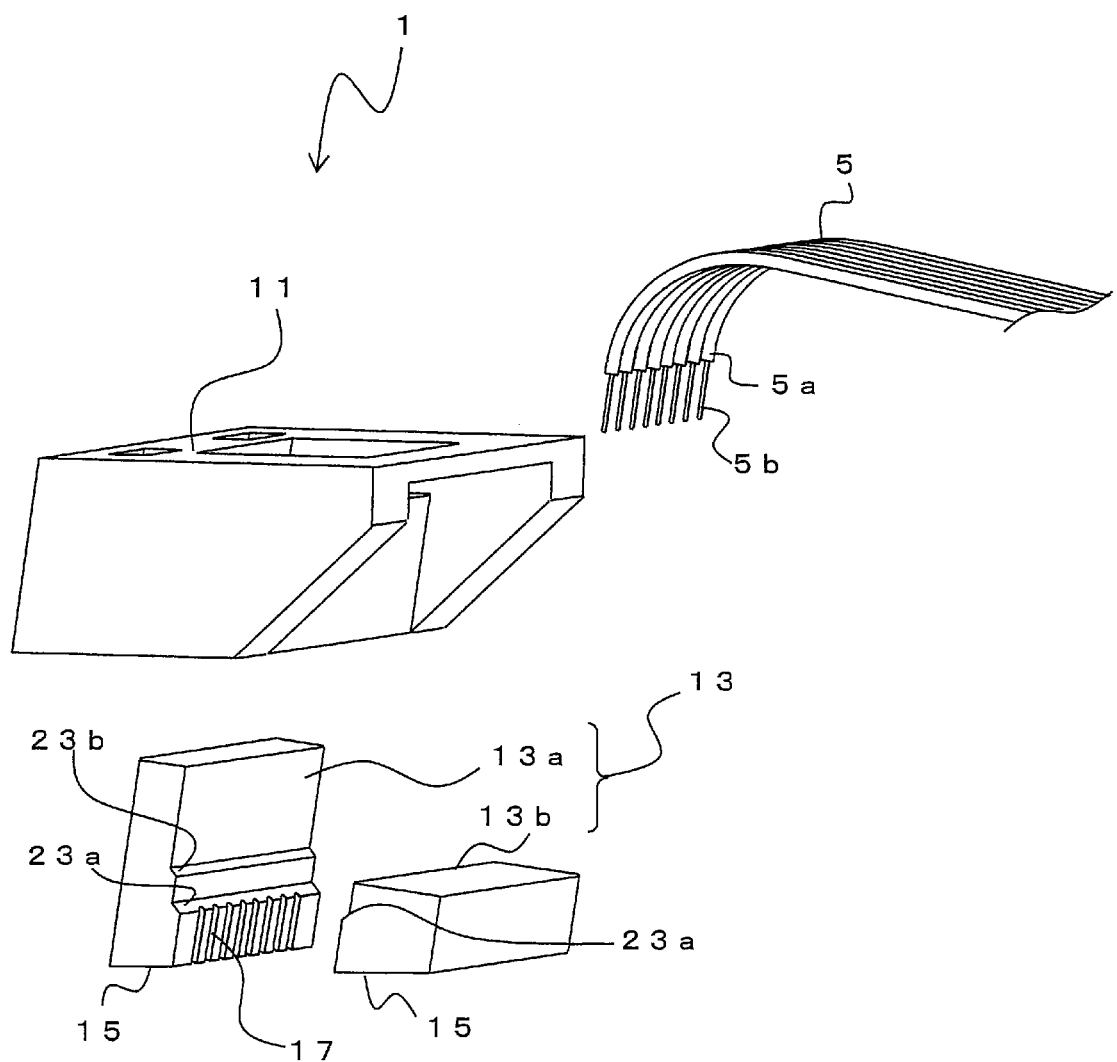
FIG. 2 is an exploded perspective view showing an optical-path-bending connector 1.
Figure 3:
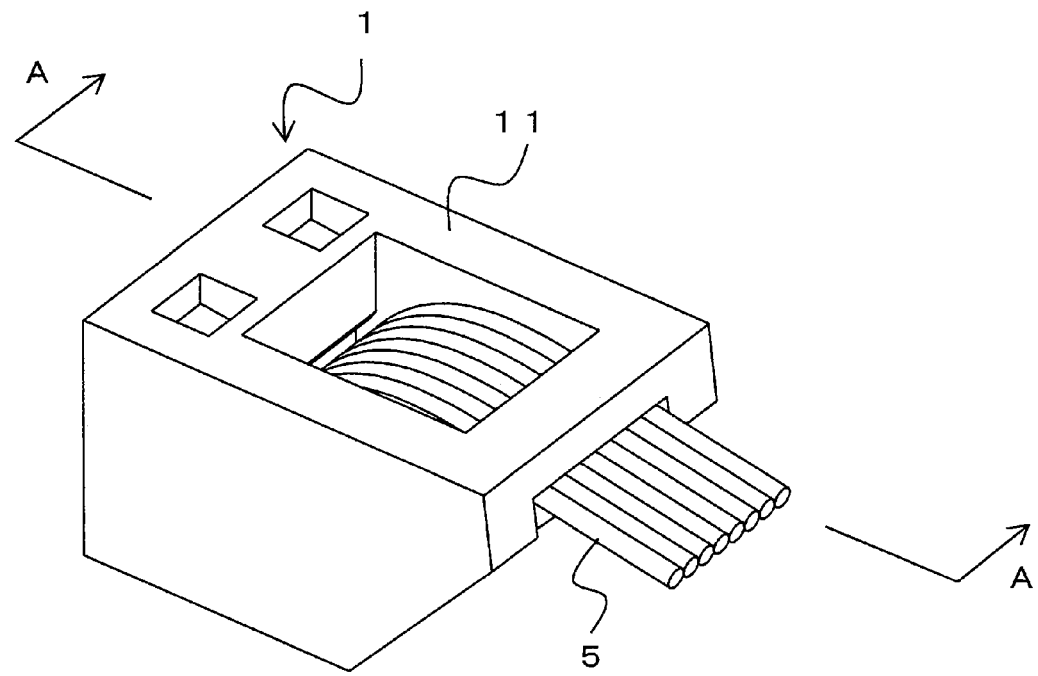
FIG. 3A is an assembled upper perspective view of the optical-path-bending connector 1.
FIG. 3B is an assembled lower perspective view of the optical-path-bending connector 1.
Figure 3:
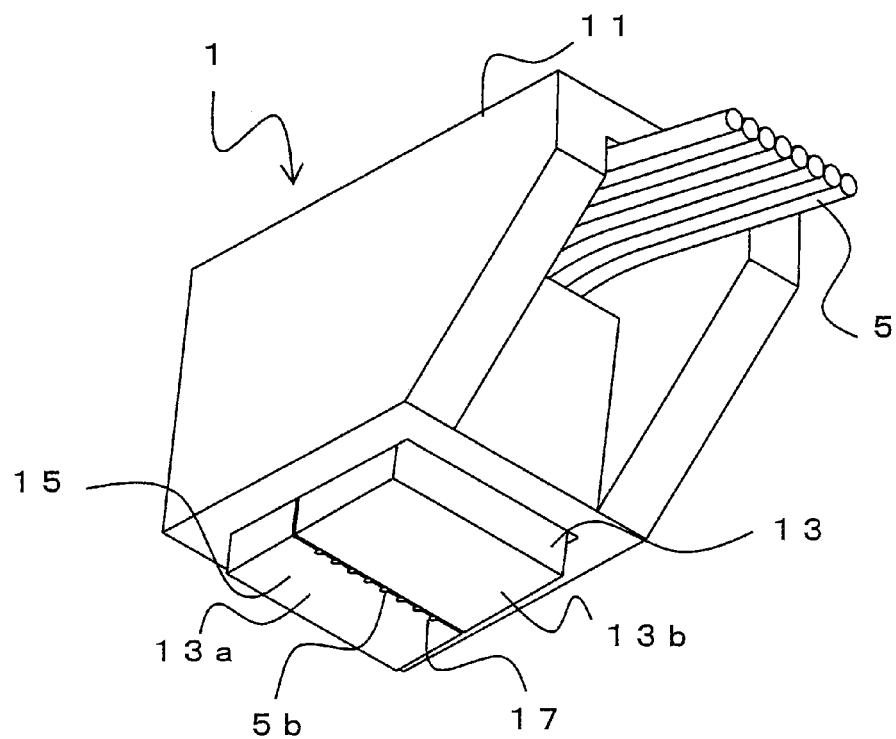
Figure 4:
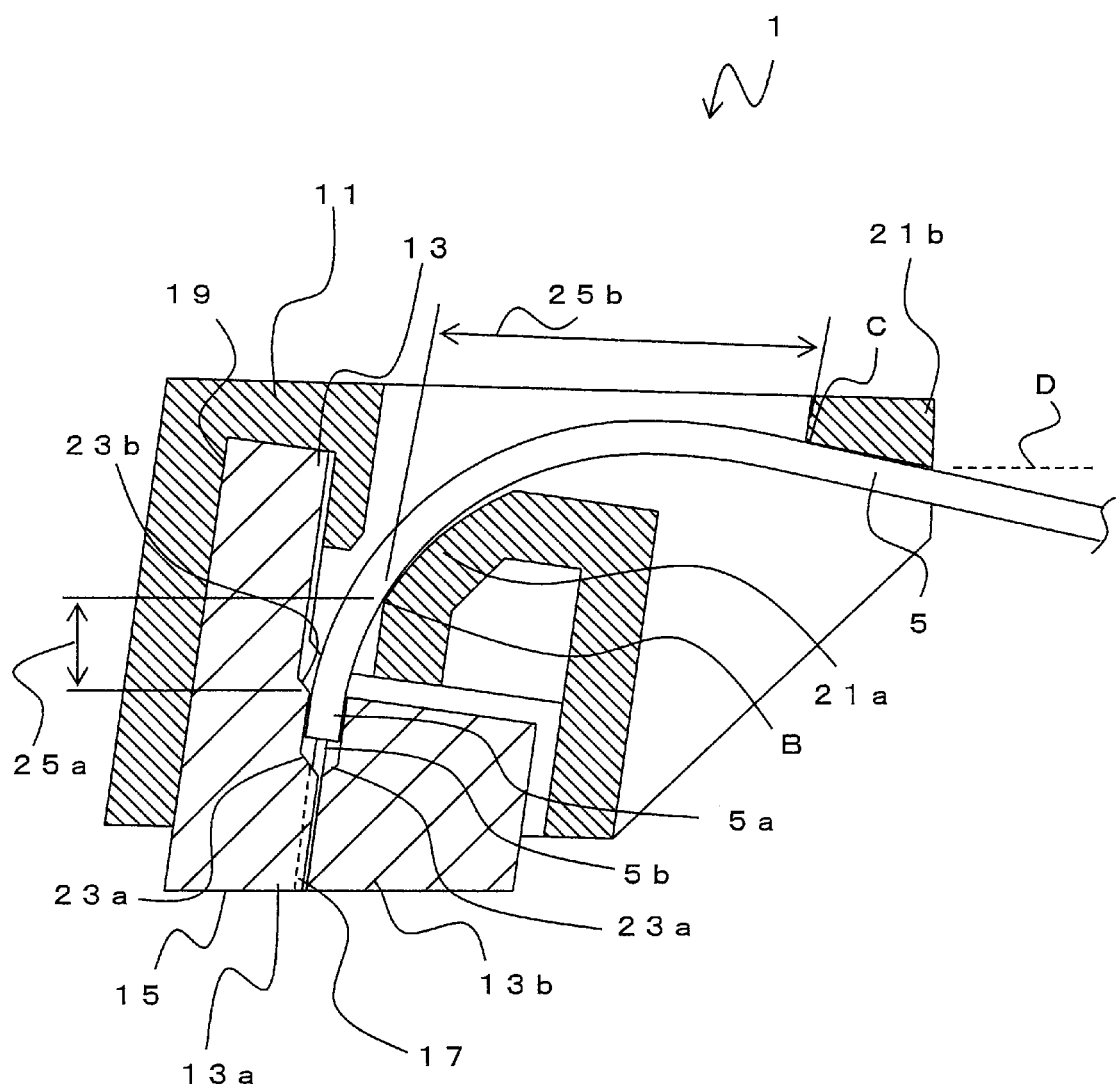
FIG. 4 is a cross sectional view taken along A-A line in FIG. 3A.

Next, details of the optical-path-bending connector 1 will be described. FIG. 2 is an exploded perspective view of the optical-path-bending connector 1, FIG. 3A is an upper perspective view of the assembled optical-path-bending connector 1, FIG. 3B is a lower perspective view of the assembled optical-path-bending connector 1, and FIG. 4 is a cross sectional view taken along A-A line in FIG. 3A. Although FIG. 2 shows a state in which the optical fiber 5 is bent, this shows a state in which the optical fiber 5 is bent by a guide member 11 that will be described below in an assembled state shown in FIG. 3A and FIG. 3B, and the optical fiber 5 is substantially straight in a state in which no external forces are applied to the optical fiber 5. The optical-path-bending connector 1 includes mainly the guide member 11, a fixing member 13, one or more optical fibers 5, and so on. As mentioned above, the optical-path-bending connector 1 is for bending an optical path from the optical component 9.

The optical fiber 5 includes a polymer coating 5a provided on an outer periphery of an optical fiber glass 5b. The polymer coating 5a is stripped over a predetermined length at one end side of the optical fiber 5, exposing the optical fiber glass 5b inside thereof.

The fixing member 13 fixes the optical fiber 5. The fixing member 13 includes a V-groove member 13a and a lid member 13b. The V-groove member 13a includes a plurality of V grooves 17 formed parallel to each other. The optical fiber glass 5b of the optical fiber 5 is disposed inside the V groove 17. The lid member 13b is disposed facing the V groove 17 of the V-groove member 13a, and the optical fiber glass 5b of the optical fibers 5 that is disposed inside the V groove 17 is held and fixed between the V-groove member 13a and the lid member 13b. With the optical fiber 5 being interposed and held, a lower surface 15 of the V groove member 13a and the lid member 13b is grinded to expose the end face of the optical fiber 5.

A first level difference 23a is formed at an upper part of the V-groove member 13a and at a part of the lid member 13b corresponding thereto, respectively. This makes a wider gap than the optical fiber glass 5b between the V-groove member 13a and the lid member 13 b, when the two are faced and fixed with each other. The polymer coating 5a of the optical fiber 5 is disposed at this part and the polymer coating 5a of the optical fiber 5 is interposed between the V groove member 13a and the lid member 13b and fixed. That is, the fixing member 13 can hold and fix both the optical fiber glass 5b where the polymer coating 5a is stripped and a part of the tip end portion of the polymer coating 5a together.

As shown in FIG. 4, the fixing member 13 is fitted to the guide member 11. That is, the fixing member 13 and the guide member 11 are formed separately. The guide member 11 includes an accommodating part 19 that accommodates the fixing member 13. The fixing member 13 is accommodated inside the accommodating part 19 and fixed to the guide member 11. The whole guide member 11 is preferably formed of one body.

Here, both of the V groove member 13a and the lid member 13b are preferably made of material that transmits ultraviolet rays. For example, it is preferable that a light transmittance at a wavelength between 300 nm and 400 nm is 40% or more for a thickness of 1 mm, and the most suitable material is glass. In this way, the optical fiber 5 can be easily fixed by being interposed between the V groove member 13a and the lid member 13b that are applied with UV curable resin and by irradiating the fixing member 13 with UV light from the outside.

The guide member 11 is preferably made of a resin that can transmit UV rays, and, for example, it is preferable that a light transmittance thereof at a wavelength between 300 nm and 400 nm is 40% or more for a thickness of 1 mm. In this way, the fixing member 13 can be easily fixed to the guide member 11 by UV curable resin. Also, if both the fixing member 13 and the guide member 11 are highly UV transmittable, the exposed part of the optical fiber 5 at the lower surface 15 and the optical component 9 (see FIG. 1) can be easily adhered to each other and fixed by using UV curable resin.

Also, to increase the transmittance of UV rays irradiated from the outside to the inside, a hole or a thin portion may be formed in at least either the guide member 11 or the fixing member 13. For example, to facilitate adhesion with the optical component, a hole or a thin portion may be formed on a side wall of the accommodating part 19 of the guide member 11 (a side wall portion on the left side in FIG. 4) or at a part of the fixing member 13 that is to be accommodated inside the accommodating part 19.

The accommodating part 19 and the fixing member 13 are fixed in surface contact at least on a side (the left side in FIG. 4) that is substantially opposite to a bending direction of the optical fiber 5 (the right side in FIG. 4), which will be described below. In this way, even when the fixing member 13 receives a repulsion force of the bend of the optical fiber 5, the guide member 11 presses the fixing member 13 with certainty and thus a position shifting or the like can be prevented.

At this time, a second level difference 23b is formed between a part of the fixing member 13 that is to be accommodated inside the accommodating part 19 and a part where the polymer coating 5a of the optical fiber 5 is interposed and held. That is, the second level difference 23b is formed on the fixing member 13 in a direction opposite to the bending direction of the optical fiber 5 so as to form a gap between the fixing member 13 and the optical fiber 5.

In this way, when the optical fiber 5 and the fixing member 13 are adhered and fixed to each other, an adhesive agent flows into the gap between the optical fiber 5 and the fixing member 13, preventing the optical fiber 5 from adhering to the fixing member 13 in the opposite direction of the bend. Thus, it is possible to prevent the optical fiber 5 drawn out from the fixing member 13 inside the guide member 11 from receiving force from other parts than a first guide part 21a and a second guide part 21b.

The optical fiber 5 is exposed at its one end at a first side of the fixing member 13 (the lower surface), lead out from a second side of the fixing member 13 (an upper part), and bent inside the guide member 11. The guide member 11 includes the first guide part 21a provided apart from the second side of the fixing member 13 (the upper part of a drawn-out portion of the optical fiber 5) in the bending direction of the optical fiber 5. The optical fiber 5 contacts the first guide part 21a on an inner side of the bend. That is, the optical fiber 5 and the guide member 11 are in contact with each other at the first guide part 21a (B in the drawing).

Here, an outer side of the bend of the optical fiber 5 at a part where the optical fiber 5 contacts the first guide part 21a does not contact the guide member 11. That is, the optical fiber 5 is not interposed between the inner side and the outer side of the bend at the first guide part 21a.

Also, the second guide part 21b is provided at a predetermined position that is a predetermined distance away from the first guide part 21a. The outer side of the bend of the optical fiber 5 contacts the second guide part 21b. That is, the optical fiber 5 and the guide member 11 are in contact with each other at the second guide part 21b (C in the drawing). Here, the inner side of the bend of the optical fiber 5 at a part where the optical fiber 5 contacts the second guide part 21b does not contact the guide member 11. That is, the optical fiber 5 is not interposed between the inner side and the outer side of the bend at the second guide part 21b. If necessary, the optical fiber 5 and the second guide part 21b may be fixed to each other by adhesive.

The optical fiber 5 is lead out from a rear of the second guide part 21b to the outside of the guide member 11. The optical fiber 5 is lead out from the fixing member 11 downwardly, slanting against the plane parallel to the lower surface 15 of the fixing member 13 where one end of the optical fiber 5 is exposed (D in the drawing). This can prevent the optical fiber 5 lead out from the guide member 11 from protruding over a height of an upper surface of the guide member 11. Thus, this can prevent the optical fiber 5 from contacting a ceiling of the case, for example, and from warping into an unnatural shape.

The optical fiber 5 can bend an optical path substantially perpendicular to an emission direction of light from the optical component 9 (see FIG. 1). That is, an angle of drawing out direction of the optical fiber 5 from the rear of the second guide part 21b is between 70° and 110° to a forming direction of the V grooves 17.

Next, a contacting form between the optical fiber 5 and the guide member 11 will be described in detail. A part in which the first guide part 21a face the optical fiber 5 has a curved shape. Also, the optical fiber 5 does not contact with an entire part of the curved surface shape of the first guide part 21a but only contacts with a part thereof. That is, in a usual state, a radius of curvature of the bend of the optical fiber 5 is different from a radius of curvature of a curved surface of the first guide part 21a.

That is, there is a gap created between the optical fiber 5 and the curved surface shape of the first guide part 21a. For example, it is preferable that the first guide part 21a and the optical fiber 5 are in point-contact at one point or at a plurality of points. The first guide part 21a may not be in the curved surface shape if it is possible to make the first guide part 21a and the optical fiber 5 in point-contact at one point or at a plurality of points.

The first guide part 21a is disposed apart from a part where the optical fiber 5 is drawn out from the fixing member 13. That is, the optical fiber 5 has a first non-contacting part 25a provided between the second side of the fixing member 13 (the part from which the optical fiber 5 is drawn out) and the first guide part 21a, where the optical fiber 5 does not contact the guide member 11. For example, the first non-contact part 25a is set to have a length of 0.5 mm or more.

By providing the first non-contact part 25a, the first non-contact part 25a can absorb influence of a slight position shifting between the fixing member 13 and the guide member 11 and the like. A position of the first guide part 21a is set so that the radius of curvature of the optical fiber 5 is larger than its minimum tolerable bending radius when the optical fiber 5 drawn out from the fixing member 13 comes into contact with any position of the first guide part 21a.

Also, the second guide part 21b is disposed apart from the first guide part 21a, and the optical fiber 5 has a second non-contacting part 25b provided between the first guide part 21a and the second guide part 21b, where the optical fiber 5 does not contact the guide member 11. That is, the optical fiber 5 is not in contact with the guide member 11 between a part where the first guide part 21a presses the optical fiber 5 from inside the bend and a part where the second guide part 21b presses the optical fiber 5 from the outside of the bend. For example, the second non-contact part 25b is set to have a length of 1.0 mm or more. By providing the second non-contact part 25b in this way, the optical fiber 5 is allowed to deform within this region, and this can prevent local stress or the like to occur.

As above, according to the optical-path-bending connector 1 of the present embodiment, bending of the optical fiber 5 fixed by the fixing member 11 is restricted only at the parts where the optical fiber 5 contacts the first guide part 21a and the second guide part 21b inside the guide member 11. Thus, there is no part of the optical fiber 5 that is completely restrained by being held from both inside and outside of the bending shape. As a result, the bending shape of the optical fiber can be kept in a predetermined region while preventing an increase in transmission loss due to lateral pressure caused by interposing of the optical fiber 5.

Also, since the fixing member 13 is separately formed form the guide member 11, fixing and the like of the optical fiber 5 is easy. Also, since the fixing member 13 and the guide member 11 are made of UV transmissible material, UV curable resin can be used for easy curing at the time of fixing each member or adhering with the optical component.

In particular, the optical fiber 5 drawn out from the fixing member 13 first contacts the first guide part 21a on the inner side of the bending direction, and thus excessive bending can be prevented with certainty. Also, since the first non-contact part 25a is formed between the part where the optical fiber 5 is drawn out from the fixing member 13 and the part where the optical fiber 5 contacts the first guide part 21a, the position shifting or the like at the time of fixing the fixing member 13 with the guide member 11 can be absorbed.

Also, since the first guide part 21a and the optical fiber 5 are in point-contact, a length of contact between the optical fiber 5 and the guide member 11 can be shortened. This can shorten a part where the optical fiber 5 receives the lateral pressure from the guide member 11, and this can prevent transmission loss caused by the lateral pressure.

Here, the inventor tried bending the optical fiber 5 freely without contacting the first guide part 21a and found out that the radius of curvature of the optical fiber 5 varies so as to be gradually increased from the drawn-out part of the fixing member 13. That is, it is found out that condition of the bend is the most severe at the drawn-out part of the fixing member 13 and the bend becomes gentler as the optical fiber 5 leaves away from the fixing member 13.

On the other hand, by forming the first guide part 21a at a part relatively closer to the upper part of the fixing member 13 and contacting the optical fiber 5 with the first guide part 21a, the optical fiber 5 at a part where the optical fiber 5 is drawn out from the fixing member 13 does not bend beyond an angle of a contacting portion direction with the first guide part 21a to a drawn-out direction (a direction of the V groove 17). For example, the angle of the contacting portion direction with the first guide part 21a to the drawn-out direction (the direction of the V groove 17) is set in a range between 5° and 30°. Thus, even if the first non-contact part 25a is formed up to the first guide part 21a, breakage of the optical fiber 5 due to excessive bending can be prevented.

Although the optical fiber 5 has been conventionally disposed along a curved surface portion of a predetermined shape to prevent excessive bending, the present invention, as described above, restricts the bending at the drawn-out part of the fixing member 13 by contacting the optical fiber 5 with the first guide part 21a and thus can prevent unnecessary lateral pressure being applied to the optical fiber 5. In particular, although considerable tension is required to bend and contact the optical fiber 5 with the curved surface portion, such tension is even unnecessary in the present invention. Thus, transmission loss of the optical fiber 5 can be suppressed and assembly is also easy.

In such a case, by making a surface of the first guide part 21a a curved surface shape, local bending of the optical fiber 5 can also be suppressed when the optical fiber 5 receives tension from the rear, for example.

Similarly, providing the second non-contact part 25b between the first guide part 21a and the second guide part 21b enables the optical fiber 5 to be free in this region. This can prevent outer force being applied to the optical fiber 5 in this region. Also, the optical fiber 5 after being drawn out of the fixing member 13 is never held from both the inside and outside of the bend at any parts thereof, and thus transmission loss of the optical fiber 5 due to lateral pressure applied thereto can be suppressed.

Also, the fixing member 13 can hold and fix the tip end portion of the polymer coating 5a together with the optical fiber glass 5b of the optical fiber 5. Thus, as mentioned above, the polymer coating 5a is not stripped at the part where the bending condition is the worst, and thus breakage due to bending can be suppressed.

Also, the optical fiber 5 is lead out from the guide member 11 downwardly, slanting against the plane parallel to the lower surface 15, and this can prevent the optical fiber 5 from contacting the ceiling part of the case.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

What is claimed is:

1. An optical-path-bending connector for bending an optical path, comprising:
    an optical fiber;
    a fixing member for fixing the optical fiber; and
    a guide member to which the fixing member is fitted, wherein:
    one end of the optical fiber is exposed at a first side of the fixing member, and the optical fiber is lead out from a second side of the fixing member to be bent inside the guide member,
    the guide member includes a first guide part, which is disposed apart from the second side of the fixing member, and a second guide part, which is disposed apart from the first guide part,
    an inner side of a bend of the optical fiber is in contact with the first guide part,
    an outer side of the bend of the optical fiber is in contact with the second guide part, and the optical fiber is lead out from a rear of the second guide part,
    the optical fiber includes a first non-contact part in which the optical fiber does not contact the guide member, the first non-contact part being provided between the second side of the fixing member and the first guide part, and
    the optical fiber includes a second non-contact part, in which the optical fiber does not contact the guide member, the second non-contact part being provided between the first guide part and the second guide part.

2. The optical-path-bending connector according to claim 1, wherein:
    a part of the first guide part facing the optical fiber includes a curved surface shape, and
    a radius of curvature of the bend of the optical fiber is different from a radius of curvature of a curved surface of the first guide part so that the optical fiber contacts a part of the curved surface shape and a gap is created partly between the optical fiber and the curved surface shape.

3. The optical-path-bending connector according to claim 1, wherein:
    the outer side of the bend of the optical fiber at a contacting part between the optical fiber and the first guide part does not contact the guide member, and
    the inner side of the bend of the optical fiber at a contacting part between the optical fiber and the second guide part does not contact the guide member.

4. The optical-path-bending connector according to claim 1, wherein:
    a polymer coating at one end side of the optical fiber is stripped off over a predetermined length, and
    the fixing member holds and fixes together both a part where the polymer coating is stripped and a part of a tip end portion of the polymer coating.

5. The optical-path-bending connector according to claim 1, wherein the optical fiber is lead out from the guide member in a downward direction slanting against a plane parallel to a lower surface of the fixing member where the one end of the optical fiber is exposed.

6. The optical-path-bending connector according to claim 1, wherein the first guide part and the optical fiber are in point contact.

7. The optical-path-bending connector according to claim 1, wherein the guide member comprises an accommodating part that accommodates the fixing member, and the accommodating part and the fixing member are in surface contact and are fixed to each other at least on a substantially opposite side of a bending direction of the optical fiber.

8. The optical-path-bending connector assembly comprising:
    an optical-path-bending connector; and
    an MT connector that is provided on an end portion of an optical fiber lead out from the optical-path-bending connector, wherein:
    the optical-path-bending connector includes a fixing member for fixing the optical fiber and a guide member to which the fixing member is attached, the fixing member and the guide member being formed separately,
    one end of the optical fiber is exposed at a first side of the fixing member, and the optical fiber is lead out from a second side of the fixing member to be bent inside the guide member,
    an inner side of a bend of the optical fiber is in contact with a first guide part,
    an outer side of the bend of the optical fiber is in contact with a second guide part, and the optical fiber is lead out from a rear of the second guide part to an outside of the guide member to be equipped with the MT connector, the first guide part is disposed apart from the second side of the fixing member where the optical fiber is drawn out, and a first non-contact part, in which the optical fiber does not contact the guide member, is provided between the second side of the fixing member and the first guide part, and the second guide part is disposed apart from the first guide part, and a second non-contact part, in which the optical fiber does not contact the guide member, is provided between the first guide part and the second guide part.

* * * * *